(No Model.) 2 Sheets—Sheet 1.
G. F. BROWN.
COUPLING FOR WATER CLOSET BOWLS.
No. 522,750. Patented July 10, 1894.
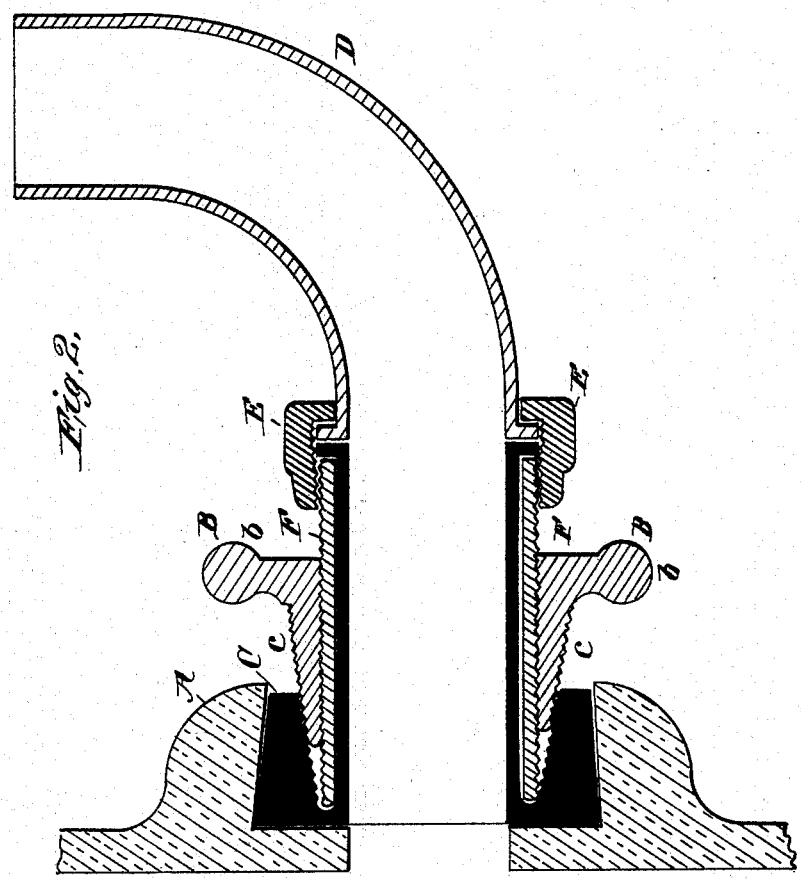
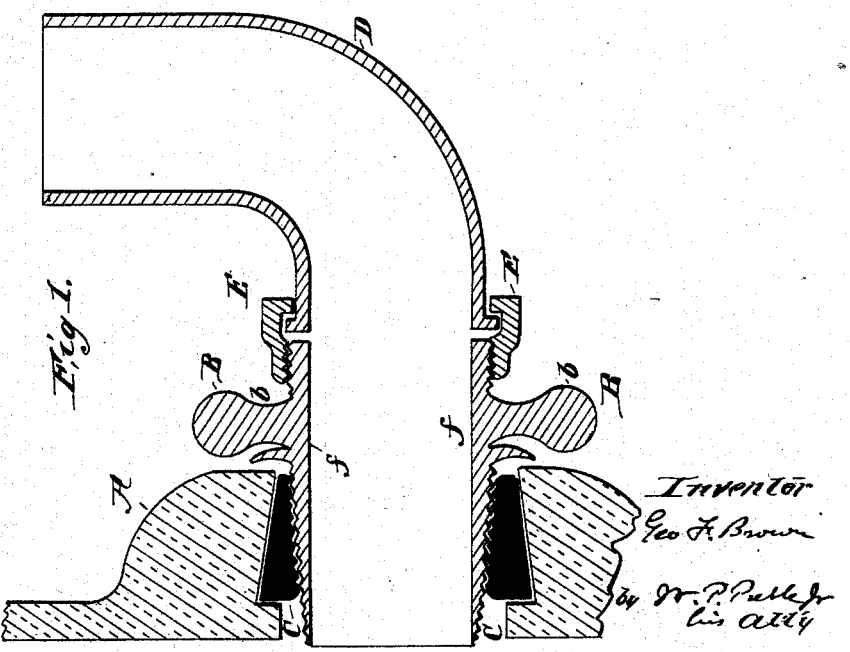
Attest:
C. W. Benjamin
J. Kennedy.
Inventor
Geo. F. Brown
by W. P. Preble Jr.
his atty (No Model.) 2 Sheets—Sheet 2.
G. F. BROWN.
COUPLING FOR WATER CLOSET BOWLS.
No. 522,750. Patented July 10, 1894.
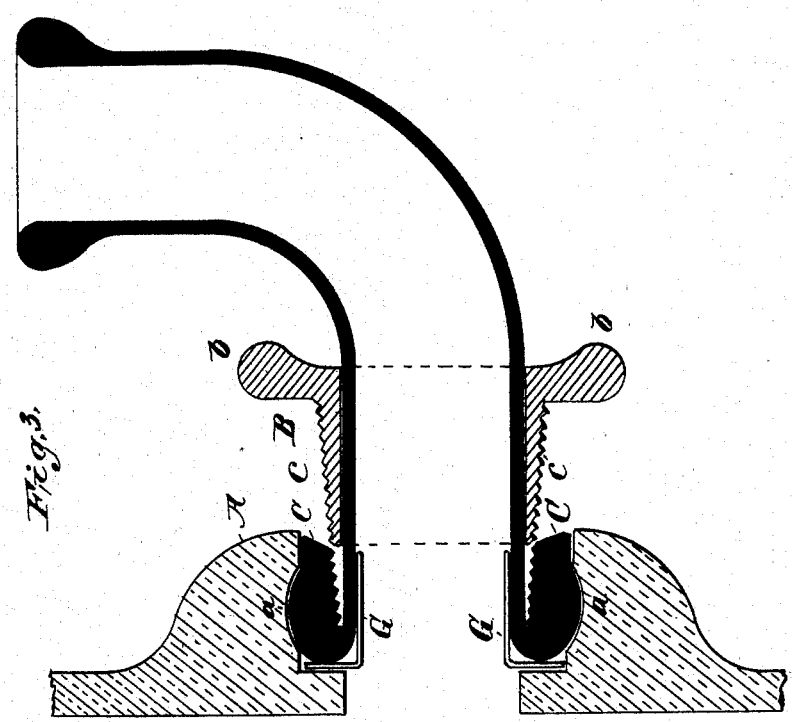
Attest:
C. W. Benjamin
J. Kennedy
Inventor:
Geo. F. Brown
by W. P. Preble Jr
his Atty

UNITED STATES PATENT OFFICE.

GEORGE F. BROWN, OF PHILADELPHIA, PENNSYLVANIA.

COUPLING FOR WATER-CLOSET BOWLS.

SPECIFICATION forming part of Letters Patent No. 522,750, dated July 10, 1894.

Application filed December 26, 1893. Serial No. 494,626. (No model.)

*To all whom it may concern:*

Be it known that I, GEORGE F. BROWN, a citizen of the United States, and a resident of the city of Philadelphia, county of Philadelphia, and State of Pennsylvania, have made certain new and useful Improvements in Couplings for Water-Closet Bowls, of which the following is a specification.

My invention relates to that class of couplings for water closet bowls, which join the supply or flushing pipe to the earthen ware nozzle of a water closet bowl, without the use of cement. A tight joint is secured in these cases by the use of rubber or some other expansible or compressible packing. Such structures have heretofore, required the use of a compressing ring intermediary between the jamb-nut and the compressible packing, which ring being loose upon the spud, does not revolve with the jamb-nut on the outside of the nozzle. The compressible packing may be either in the form of a packing ring or of a rubber elbow, so called, according to whether a flexible or rigid connection of the supply pipe is desired.

In my invention, the intermediate compressing ring is done away with; and a peculiar form of tightener is introduced.

In the accompanying drawings: Figure 1 shows my invention as used with a compressible packing ring. Fig. 2 shows my invention, as used with a compressible rubber spud with metallic elbow, and Fig. 3 shows my invention, as used with a flexible rubber elbow, the turned back end of which serves as a compressible packing.

Same letters indicate similar parts in the different drawings.

A is the earthenware nozzle, provided with the usual opening, the walls of which may taper, as shown in Figs. 1 and 2, or may be straight, with or without a recess, shown at a, Fig. 3. The character of surface given to this inner wall of the nozzle, of course, depends upon the amount of friction needed between the earthenware and the compressible packing to make a tight joint, and one which will not be pulled apart in use.

B is my improved wedge or tightener, which is made of metal or other suitable material, and which preferably is provided with the ears or lugs $b-b$, which can be grasped by hand and thus turn the tightener in either direction, when it is desired to tighten or loosen the joint. The peculiarity of this tightener is that it tapers in such a way as to act as a continuous wedge, when it comes in contact with the compressible packing C, as shown in Figs. 1, 2, and 3. This tapering wedge is provided with teeth $c$, which engage corresponding teeth on the inner surface of the compressible packing; but the presence of these teeth upon the packing, may be dispensed with, if preferred, as the natural effect of turning the toothed or screw-threaded wedge is to cut suitable teeth on the compressible packing.

As before stated, the compressible packing C may be used in various forms such as a simple ring surrounding the tightener, as shown in Fig. 1, or the turned back end of a rubber spud or elbow as shown in Figs. 2 and 3. Other modifications will readily suggest themselves.

When the tightener is used as shown in Figs. 1 and 2 with a rigid elbow D, the usual coupling-nut E is employed to connect this rigid elbow either with the tightener itself when used, as shown in Fig. 1, or with a metallic spud or threaded sleeve F, as shown in Fig. 2, around which the tightener turns. In this latter case, the flexible spud C is provided with a flange $d$, against which the corresponding flange of the rigid elbow D is forced by the coupling-nut E, thus holding the rubber spud rigid. The other end of the flexible spud is turned back over the end of the metallic sleeve F and the tightener B, as shown, and serves as a substitute for the compressible packing ring of Fig. 1.

When a flexible elbow, as shown in Fig. 3, is employed, the coupling nut E and the metallic sleeve F may be dispensed with; but in this case, it is advisable to use a metallic, flanged spud G, inserted in the turned over end of the rubber elbow, for the purpose of stiffening the elbow at that point, when subjected to the pressure of the tightener B. In Fig. 1, it is desirable that the tightener should be provided with the flange $f$, which brings up against the outer suface of the earthenware nozzle and serves to secure the joint, as well as to prevent the tightener from being turned too far through the nozzle.

The uses and advantages of my improved coupling will be readily understood by persons familiar with this line of manufacture, without further explanation.

I claim—

1. A coupling for water closet bowls, which consists of a flexible tube, one end of which is turned back upon itself and serves as a compressible packing and a screw-threaded, tapering wedge surrounding said tube and adapted to force itself between said tube and said turned back end, whereby said turned back end is compressed against the inner wall of the nozzle of the water closet bowl, substantially as shown and described.

2. The above described coupling for water closet bowls, which consists of a compressible packing ring, adapted to enter the nozzle of said bowl and of a tapering wedge adapted to be turned into said ring and having an external screw thread along the portion of its surface, which comes in contact with said ring, whereby it is adapted to compress the same against the inner wall of said nozzle, substantially as shown and described.

GEO. F. BROWN.

Witnesses:
HAROLD VAN DUZER,
MORRIS R. BOCKIUS.